US007481611B2

(12) United States Patent
Hoarau

(10) Patent No.: US 7,481,611 B2
(45) **Date of Patent: *Jan. 27, 2009**

(54) SYSTEM AND METHOD FOR FORMING A BOUND DOCUMENT

(75) Inventor: Eric Hoarau, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/284,706

(22) Filed: Nov. 22, 2005

(65) Prior Publication Data

US 2006/0072982 A1 Apr. 6, 2006

Related U.S. Application Data

(63) Continuation-in-part of application No. 10/953,549, filed on Sep. 30, 2004.

(51) Int. Cl.
*B42C 9/00* (2006.01)
*B42C 11/00* (2006.01)
*B32B 3/04* (2006.01)

(52) U.S. Cl. .................. 412/6; 412/1; 412/4; 156/216; 156/908

(58) Field of Classification Search ..................... 412/1, 412/3, 4, 6, 8, 9, 19, 20, 22, 33, 36, 37; 156/222, 156/196, 212, 214, 216, 908; 281/21.1, 29, 281/36
See application file for complete search history.

(56) References Cited

U.S. PATENT DOCUMENTS 4,496,617 A * 1/1985 Parker ......................... 428/55
5,340,155 A * 8/1994 Podosek ...................... 281/29
6,142,721 A * 11/2000 Marsh ........................... 412/1
6,599,073 B1 * 7/2003 Hartwig et al. ................ 412/8
6,619,900 B2 9/2003 Cobene, II et al.
6,641,345 B2 11/2003 Cobene, II et al.
6,709,727 B1 * 3/2004 Parker ....................... 428/40.1
6,732,777 B2 5/2004 Ertel et al.
6,739,816 B1 5/2004 Schuder et al.
6,948,897 B2 * 9/2005 Lawton ......................... 412/2
2002/0067977 A1 6/2002 Cobene, II et al.
2002/0106264 A1 8/2002 Cobene, II et al.
2002/0119029 A1 8/2002 Cobene et al.
2002/0168248 A1 11/2002 Ertel et al.
2004/0009054 A1 1/2004 Cobene, II et al.
2004/0086359 A1 5/2004 Ertel et al.
2004/0240965 A1 12/2004 Schuder et al.
2004/0240966 A1 12/2004 Cobene, II
2005/0011610 A1 1/2005 Cobene, II
2005/0095086 A1 5/2005 Cobene, II et al.

* cited by examiner

*Primary Examiner*—Dana Ross
*Assistant Examiner*—Kyle Grabowski

(57) ABSTRACT

A method of forming a bound document includes providing a text body defining a first sheet and a last sheet, aligned edges of the sheets defining a spine, the spine being bound with an adhesive strip to define a first wing and a second wing of the adhesive strip, wherein the first wing extends beyond the first sheet of the text body, and the second wing extends beyond the last sheet of the text body. The method further includes compressing the first wing of the adhesive strip against the first sheet to form a first exposed adhesive bead; compressing the second wing of the adhesive strip against the last sheet to form a second exposed adhesive bead; and applying a cover over the text body and against the first and second exposed adhesive beads to attach the cover to the bound text body as a floating cover.

19 Claims, 14 Drawing Sheets

SYSTEM AND METHOD FOR FORMING A BOUND DOCUMENT

CROSS-REFERENCE TO RELATED APPLICATIONS

This application is a continuation-in-part of application Ser. No. 10/953,549 filed Sep. 30, 2004, and entitled "A Method and System of Sheet-Wise Binding of Documents," which is incorporated by reference herein in its entirety.

BACKGROUND

Bookbinding systems can deliver bound documents, including books, manuals, publications, annual reports, newsletters, business plans and brochures. A bookbinding system collects a plurality of sheets (or pages) into a text body (or book block) and applies an adhesive to bind the text body to the cover to form bound documents. Typically, two adhesives are needed. A first adhesive, such as a hot melt adhesive, is needed to bind the plurality of sheets into a text body. A second adhesive, such as a pressure sensitive adhesive, is needed to bind the bound text body to a cover to form the bound document.

Many different systems have been proposed for applying adhesive to a text body spine to bind the text body sheets together.

A system of binding sheets is known which includes a multi-function sheet binder configured to heat a preformed solid hot melt adhesive to a melting temperature. The melted adhesive is formed by pressing the melted adhesive into a spine of a text body and folding down edges of the melted adhesive into contact with the text body. The formed adhesive is then cooled by an adhesive cooler.

A book binder is known that includes a tape heating apparatus with a main heater and a pair of side heaters. The main heater is configured to preheat the entire length of a hot melt adhesive tape. After the spine of a text body is pressed against the preheated hot melt adhesive tape, the pair of side heaters press the overhanging sides of the adhesive tape against the text body to complete the binding of the sheets into a bound text body.

A known apparatus for binding sheets includes an aligning plate that aligns the sheets at the side edge, and two clamping plates that hold the sheets during binding. A heating platen heats and melts a backless solid hot melt adhesive that is placed along the sheet edges. The hot melt adhesive binds the sheets together at the spinal area. The hot melt adhesive also may be used to attach a preformed book cover to the text spine.

Exemplary paperback bookbinding schemes include a cover, with an adhesive strip disposed along a spine area, that is forced between a pair of pressing rollers to form a pocket. A text body is inserted into the pocket with the text body spine in contact with the adhesive strip. The pressing rollers move forcibly toward one another to press the cover firmly against the front and back sides of the text body and to compress the text body sheets together tightly in the area adjacent to the spine. A sonic tool transmits sonic energy to the cover to activate the adhesive strip and, thereby, bind the text body sheets and the cover into a perfectly bound book.

A known adhesive applicator is configured to spread coat an adhesive onto the spine and side edges of the text body to bind the text body sheets and a cover into a perfectly bound book with an attached spine. The adhesive applicator includes a book spine coating nozzle with adjustable side sealing jaws for adjusting the nozzle width for different book thicknesses and separate side glue outlets for depositing glue on the book sides. Glue flow control valves are disposed between the spine coating nozzle and the side glue outlets so the glue deposited on the book sides may be selectively and independently cut off or controlled.

SUMMARY

One aspect of the present invention relates to a method of forming a bound document. The method includes providing a text body defining a first sheet and a last sheet, aligned edges of the sheets defining a spine, the spine being bound with an adhesive strip to define a first wing and a second wing of the adhesive strip, wherein the first wing extends beyond the first sheet of the text body, and the second wing extends beyond the last sheet of the text body. The method further includes compressing the first wing of the adhesive strip against the first sheet to form a first exposed adhesive bead; compressing the second wing of the adhesive strip against the last sheet to form a second exposed adhesive bead; and applying a cover over the text body and against the first and second exposed adhesive beads to attach the cover to the bound text body as a floating cover.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF EXEMPLARY EMBODIMENTS

In the following detailed description of the preferred embodiments, reference is made to the accompanying drawings to form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
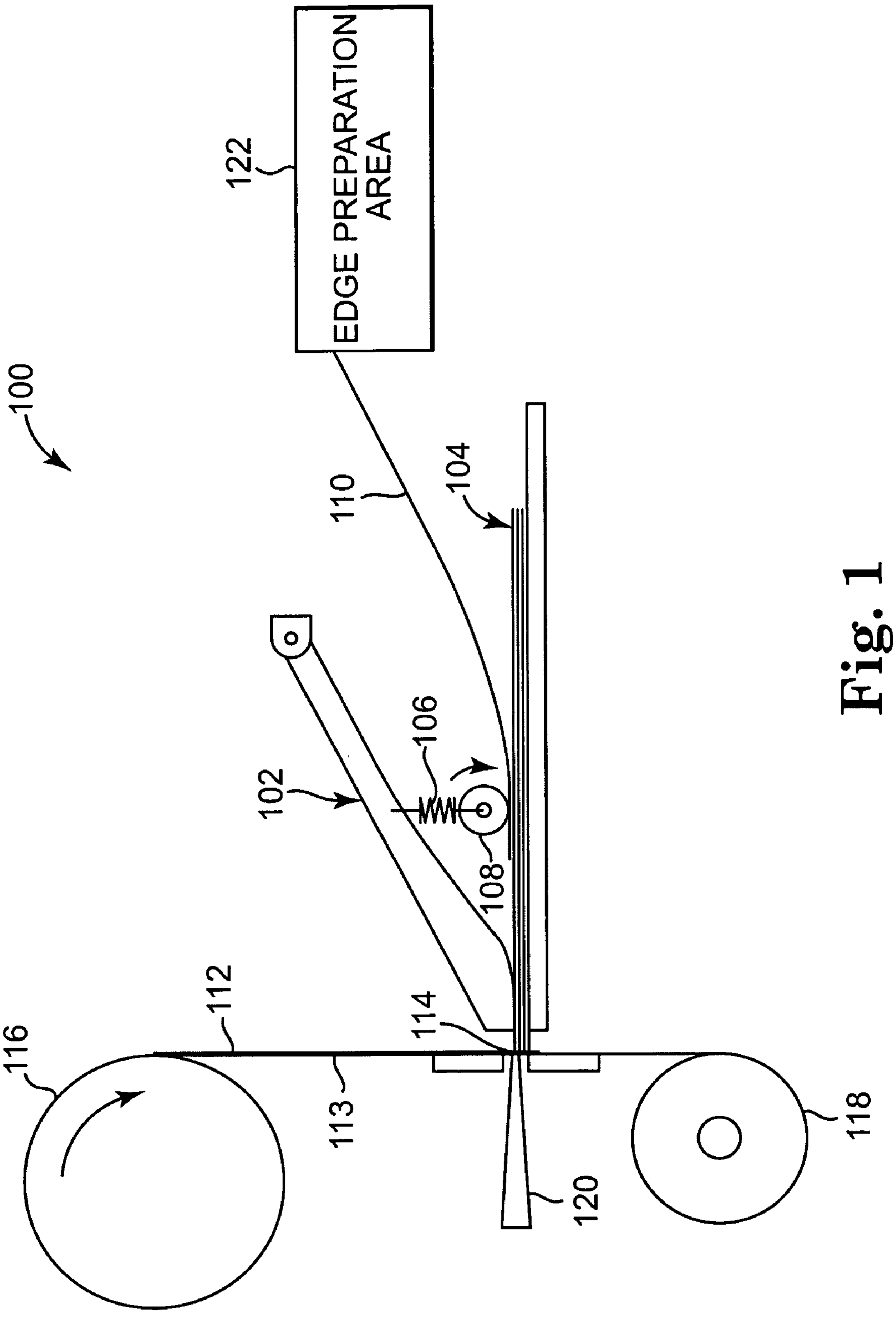
FIG. 1 illustrates an exemplary system for sheetwise binding of documents.

FIG. 1 illustrates an exemplary system 100 for binding sheets. The binding system 100 may be implemented as a desktop or office book making system designed to satisfy on-demand bookbinding needs. However, the document binding system 100 may also be used for any other suitable application, such as for commercial or home use.

The system 100 includes a clamp 102 for accumulating a plurality of sheets 104. Sheets 104 can enter the clamp 102 sheetwise; that is on an individual sheet-by-sheet basis. However, more than one sheet at a time may be accumulated in the clamp 102.

According to an exemplary embodiment, the clamp 102 includes a spring 106 and a roller 108. A newly added sheet 110 is transferred toward the adhesive by way of the roller 108. The spring 106 allows the distance between the jaws of the clamp 102 to be increased when a new sheet is added. For example, as a new sheet 110 is added, the spring is slightly compressed to accommodate for the newly added sheet. However, it should be understood that other constraining devices may be used. For example, plates and other constraining devices can be placed in contact with the newly added sheet to constrain the sheet thereon. The position and number of constraining devices can be a function of the paper properties, such as the paper weight, structural characteristics and so forth.

To bind the plurality of sheets 104 together, an adhesive is applied. For example, an adhesive layer 112 is supported on a backing material 113 and is disposed adjacent an edge 114 of each of the plurality of sheets 104. Examples of suitable adhesives include a hot melt adhesive, a light curable adhesive, or a moisture curable adhesive. A suitable light curable adhesive includes LC-1212 light curable adhesive available from 3M® Corporation of Minneapolis, Minn., which cures at a wavelength of 400 to 500 nm. Other suitable light curable adhesives include acrylate-based adhesives curable in the visible, ultraviolet (UV) or infrared (IR) spectrum. A single adhesive is used to bind the individual sheets together into a text body and to bind a text body to the cover. However, it should be understood that more than one adhesive can be used.

According to an exemplary embodiment, the backing material 113 allows the adhesive to be applied to the individual sheets, while protecting and preserving the side of the adhesive to be attached to the cover until the sheetwise binding operation is complete. In this way, the backing material 113 may be coated, so that it may be easily removed from the adhesive layer 112 when a cover is to be attached to the text body.

According to an exemplary embodiment, the adhesive layer 112 may be dispensed with a roller 116. When the adhesive layer 112 is dispensed by roller 116, a counter roller 118 collects unused backing material 113. Alternatively, the adhesive layer 112 may be dispensed in predetermined lengths. For example, the length of the sheets and the width of the text body are measured prior to applying the adhesive. An adhesive layer 112 is then measured and precut to meet the particular bookbinding needs. However, it should be understood that the adhesive may be applied in any suitable manner.

To attach the adhesive to the edges 114 of the plurality of sheets 104, the adhesive layer 112 is heated. A heater 120 is disposed on a side of the adhesive layer adjacent the backing material 113 to locally melt only a portion of the adhesive layer in a vicinity of a sheet 110 placed against the adhesive layer 112. The heater 120 can be sized according to the size of a sheet edge placed adjacent to the adhesive layer 112. For example, a surface of the heater facing sheet 110 can be as wide and long as an individual sheet to be bound. However, it should be understood that the size of a heating surface of the heater may be chosen depending on design preference and applicability. According to the exemplary embodiment, the heating surface is at least 0.5 mm wide, but may be wider and narrower as described above. To heat at a faster rate, a heater 120 with a wider heating surface can be provided to heat more than one sheet at a time. According to an exemplary embodiment, the heater 120 preferably operates at approximately 160° C. (e.g., ±10%), or at any desired temperature lesser or greater than 160° C. For example, depending on the particular adhesive used, this temperature can be varied as empirically deemed appropriate to achieve a desired melt rate for a chosen volume of a selected adhesive over a desired area.

The system 100 optionally includes an edge preparation area 122, in which the each of the plurality of sheets 104 along the contacting surface is prepared prior to being placed adjacent the adhesive layer 112. In an exemplary embodiment, edge preparation area 122 includes devices for performing one or more of roughing, cutting, tearing, trimming, bending, folding and perforating of the sheets. Additional edge preparation devices and methods include devices for notch binding, in which notches are made on the contacting surface, e.g., edge or folded edge, by removing small sections to allow penetration of adhesive into individual sheets, and bursting binding in which large cuts made in the contacting surface of the sheet allow penetration of the adhesive material. Slits can also be made on the contacting surface with, for example, a toothed wheel, and milling the contacting surface with a grinder to produce rough edges. Fibers in the sheet exposed in these methods strengthen adhesion between the adhesive material and the sheet. Also, the area of the contacting surface exposed to the adhesive can be increased to thereby increase the binding strength.

In an exemplary embodiment, the adhesive layer 112 including the backing material 113 is placed adjacent an edge 114 of the plurality of sheets 104. As each sheet 104 is placed in the clamp 102, the heater 120 can include a motor device to move the heating surface into a position to locally heat the adhesive layer 112 in a vicinity of that sheet. Alternatively, the heater 120 may remain stationary, while the clamp 102 moves to align a newly added sheet 110 with the heater 120, or both the heater and the clamp can be moved synchronously to align the heating surface with one or more desired sheets.

Figure 2:
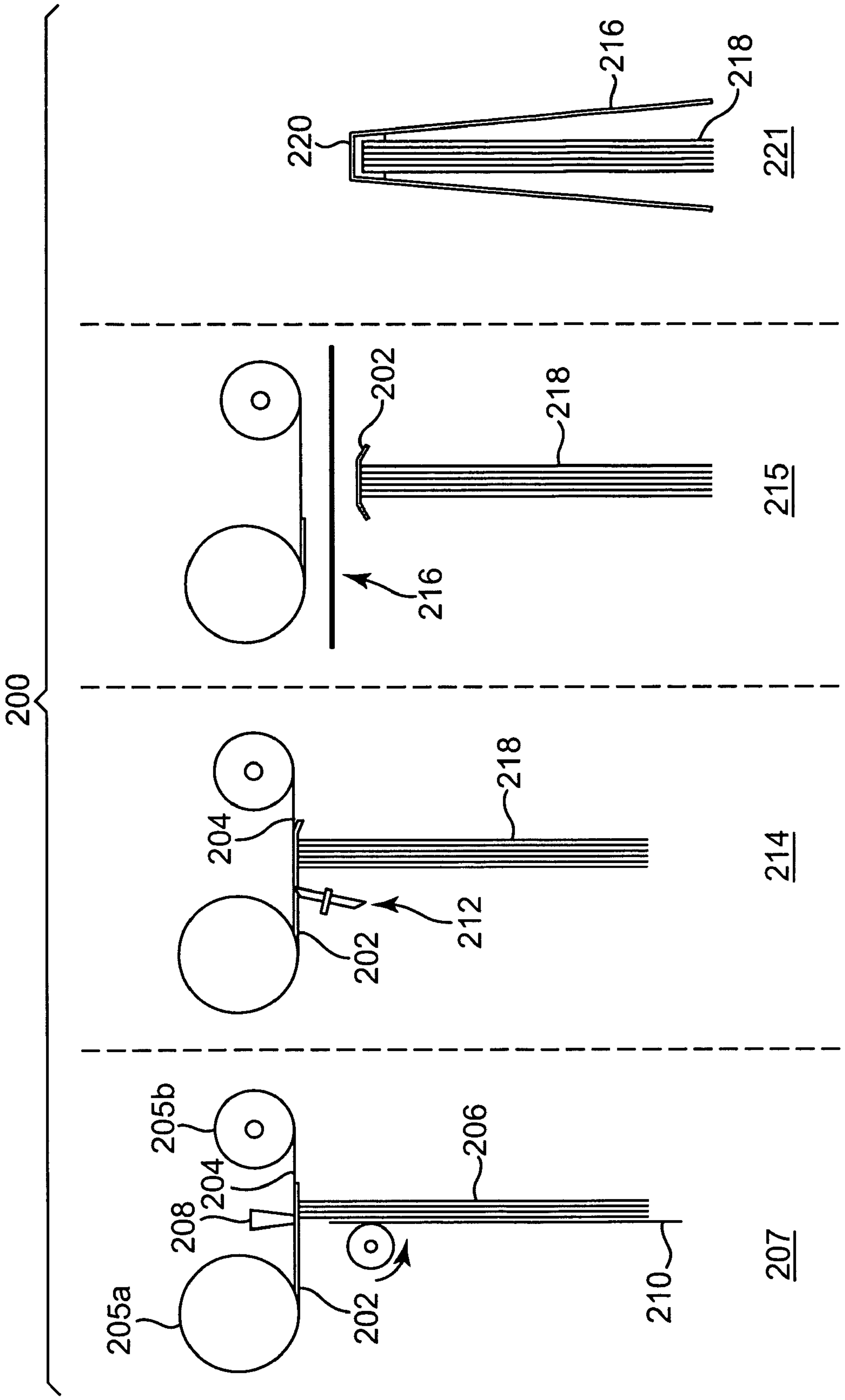
FIG. 2 illustrates an exemplary method of sheetwise binding of documents.

An exemplary method of sheetwise binding of documents is illustrated in FIG. 2. The FIG. 2 method 200 comprises providing an adhesive layer 202 supported on a first side of a backing material 204. According to the exemplary method, the adhesive layer 202 and backing material 204 are dispensed by way of a roller 205*a* and the unused backing material 204 is collected by way of counter roller 205*b*. However, the adhesive layer 202 may also be applied in predetermined sizes.

The exemplary method includes accumulating plural sheets 206 against the adhesive layer 202 and applying heat locally to the adhesive layer 202 in an accumulating operation 207. According to the exemplary embodiment, a heater 208 is applied to a side of the adhesive layer 202 adjacent the backing material 204 to locally melt only a portion of the adhesive layer 202 in a vicinity of an additional sheet 210 accumulated against the adhesive layer 202.

Once the sheets 206 are accumulated against the adhesive layer 202 and the adhesive layer 202 and the plural sheets 206 are bound into a text body 218, the adhesive 202 may be cut by a cutter 212 in a cutting operation 214. Excess backing material 204 may then be removed by way of counter roller 205*b*.

In a subsequent operation 215, a cover 216 is applied over the text body 218 and against the exposed adhesive layer 202. The cover can be prepared to a selected spine width, such as a spine width corresponding to a dimension of the text body. The resulting bound document 220 includes the cover 216 adjacent the text body 218, as shown in operation 221.

Figure 3:
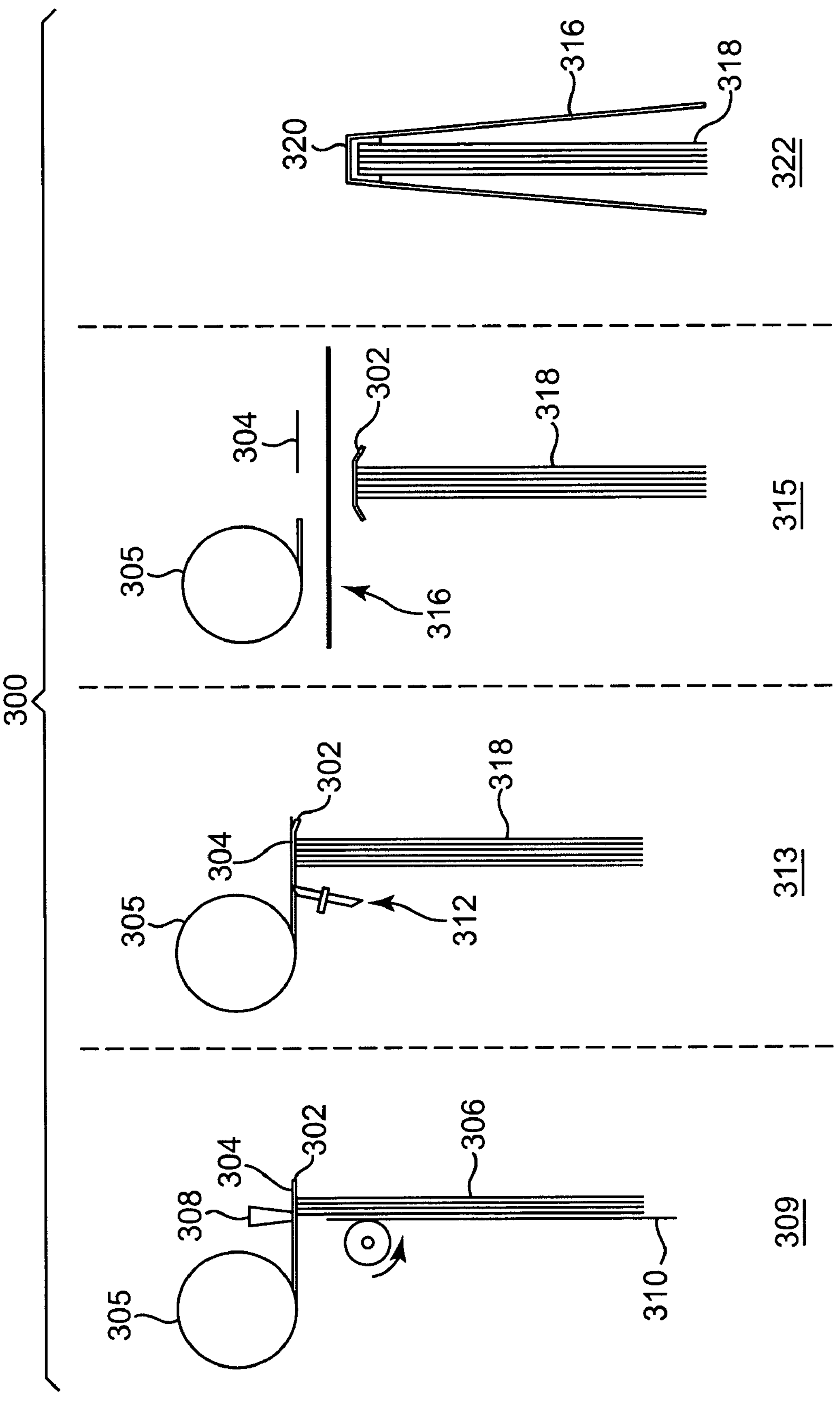
FIG. 3 illustrates another exemplary method of sheetwise binding of documents.

Another exemplary method of sheetwise binding of documents is illustrated in FIG. 3. The FIG. 3 method 300 comprises providing an adhesive layer 302 supported on a first side as a backing material 304, as shown in operation 309. According to the exemplary method, the adhesive is dispensed by way of a roller 305. However, the adhesive layer 302 may also be applied in predetermined sizes.

According to operation 309, plural sheets 306 are accumulated against the adhesive layer 302, and heated by way of heater 308 (located, for example, adjacent the backing material 304) to locally melt a portion of the adhesive layer 302 in a vicinity of an additional sheet 310. Once the sheets are accumulated into a text body 318, the adhesive layer 302 and the backing material 304 are cut by way of cutter 312 in a cutting operation 313. The adhesive layer 302 and backing material 304 are cut so that portions of the adhesive layer and backing material extend beyond a spine of the text body 318. Both the backing material 304 and adhesive layer 302 can be cut at the same time. Because the backing material 304 is also cut, a counter roller is not needed for the remaining backing material.

In an optional operation, the portions of the adhesive layer 302 and backing material 304 extending beyond the bound text body 318 may be folded over, or compressed and then heated against the first and last sheets accumulated so that adhesive is exposed beyond the backing material on the first and last sheets. The backing material 304 may remain on the adhesive layer 302 when a cover is applied. In this way, a floating spine is produced. Alternatively, the backing material may then be completely removed.

In a subsequent operation 315, a cover 316 is applied over the text body 318 and against the exposed adhesive layer 302. The cover 316 can be prepared to a selected spine width, such as a spine width corresponding to a dimension of the text body. The resulting bound document 320 includes the cover 316 adjacent the text body 318, as shown in operation 322.

Figure 4:
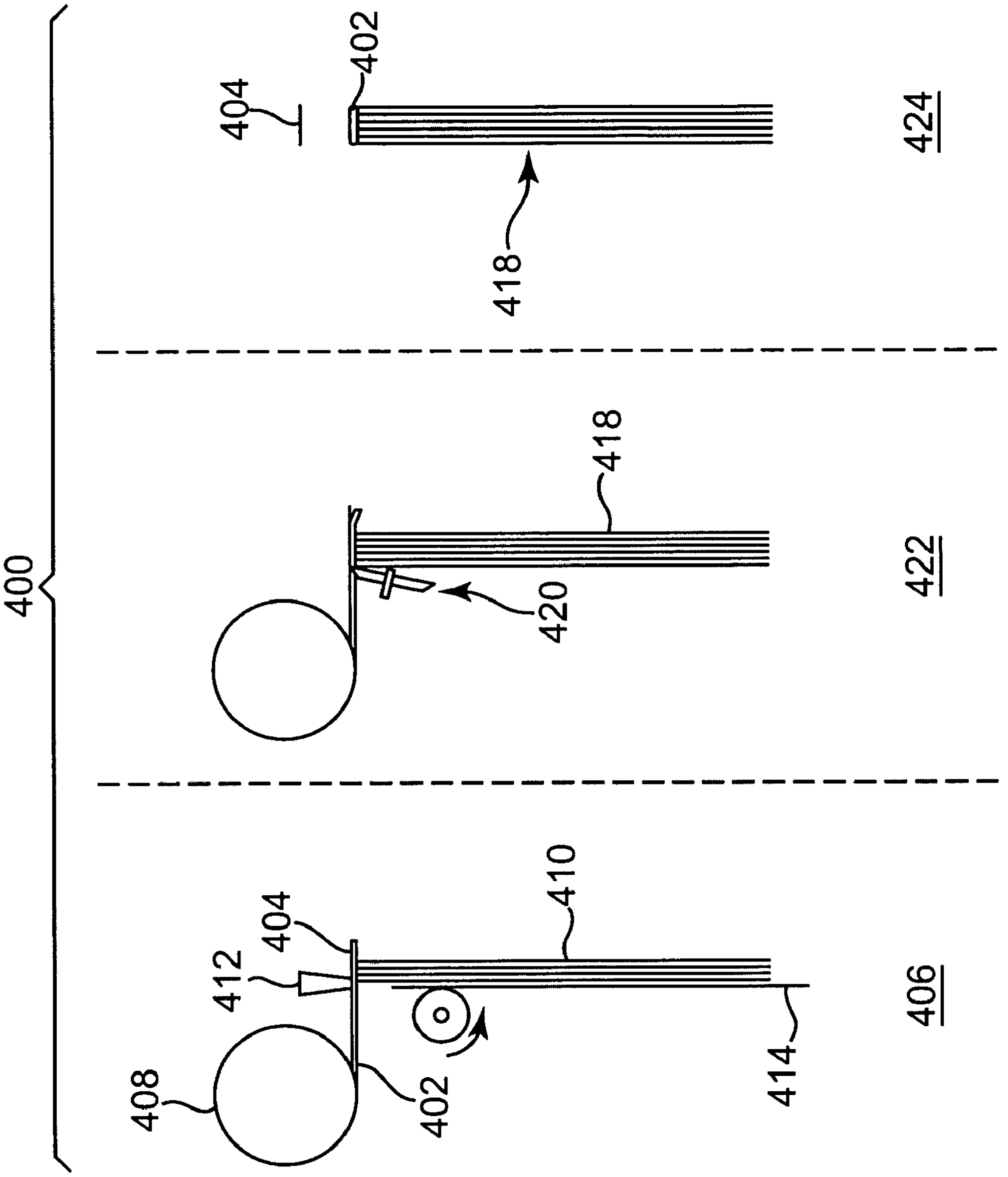
FIG. 4 illustrates another exemplary method of sheetwise binding of documents.

Another exemplary method of sheetwise binding of documents is illustrated in FIG. 4. The FIG. 4 method 400 comprises providing an adhesive layer 402 supported on a first side as a backing material 404, as shown in operation 406. According to the exemplary method, the adhesive is dispensed by way of a roller 408. However, the adhesive layer 402 may also be applied in predetermined sizes.

According to operation 406, plural sheets 410 are accumulated against the adhesive layer 402, and heated by way of heater 412 (located, for example, adjacent backing material 404) to locally melt a portion of the adhesive layer 402 in a vicinity of an additional sheet 414. Once the sheets are accumulated into a text body 418, the adhesive layer 402 and the backing material 404 are cut by way of cutter 420 in a cutting operation 422. The adhesive layer 402 and backing material 404 are cut so that excess adhesive and backing material protruding beyond the sides of the text body 418 are removed. Both the backing material 404 and adhesive layer 402 can be cut at the same time. Because the backing material 404 is also cut, a counter roller is not needed for the remaining backing material.

The backing material 404 is then separated from the adhesive layer 402 in a separation operation 424. A cover can then be folded around the text body.

In accordance with an exemplary method and system, a single adhesive is used to both bind the text body and add a cover. To make the backing material removable, the backing material is coated which enables it to be removed after applying heat. In addition, an exemplary system and method are capable of binding as few as two sheets of paper into a text body.

Figure 5A:
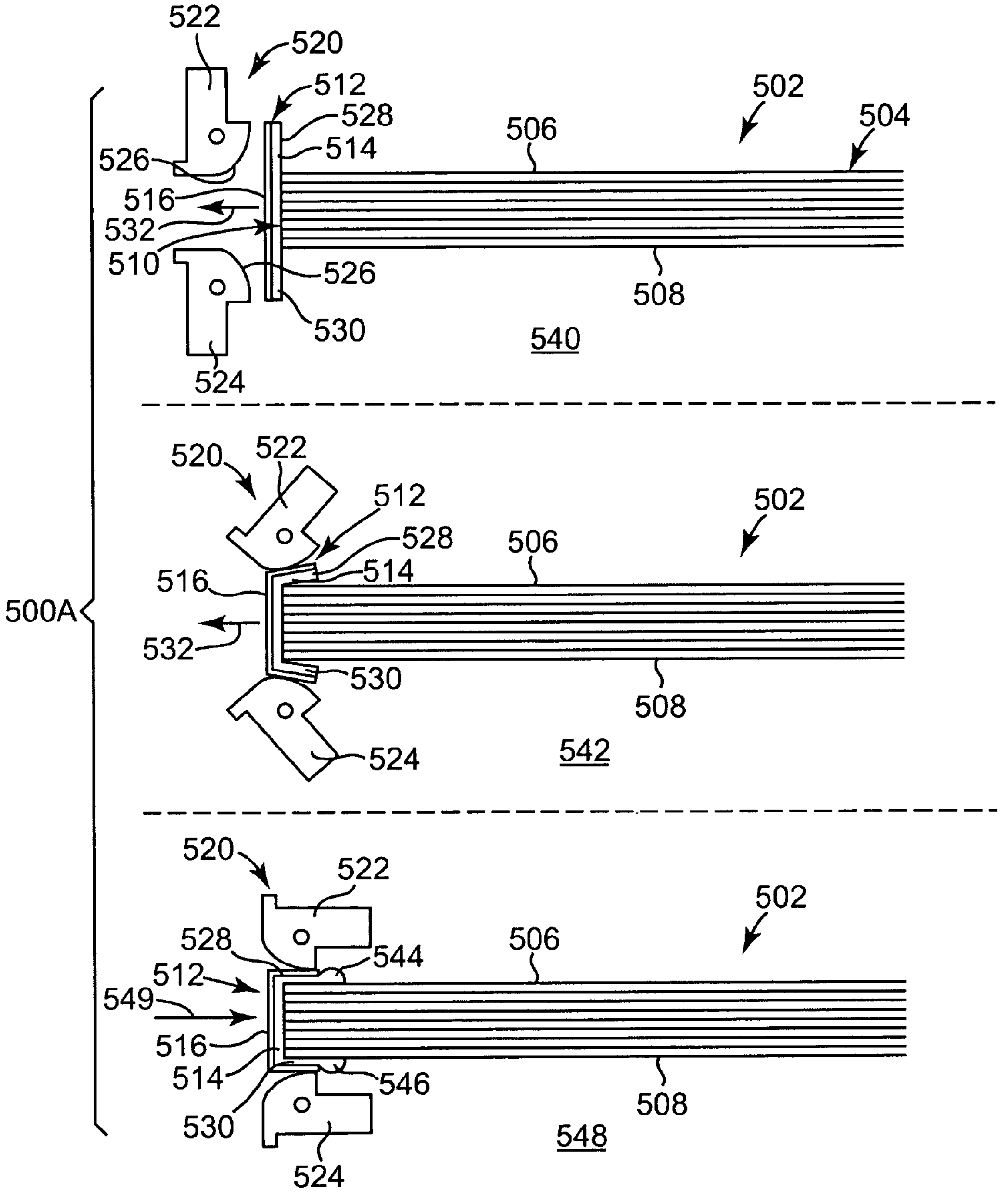
FIG. 5A illustrates a portion of one embodiment of a system and method for binding a book and attaching a cover.
Figure 5B:
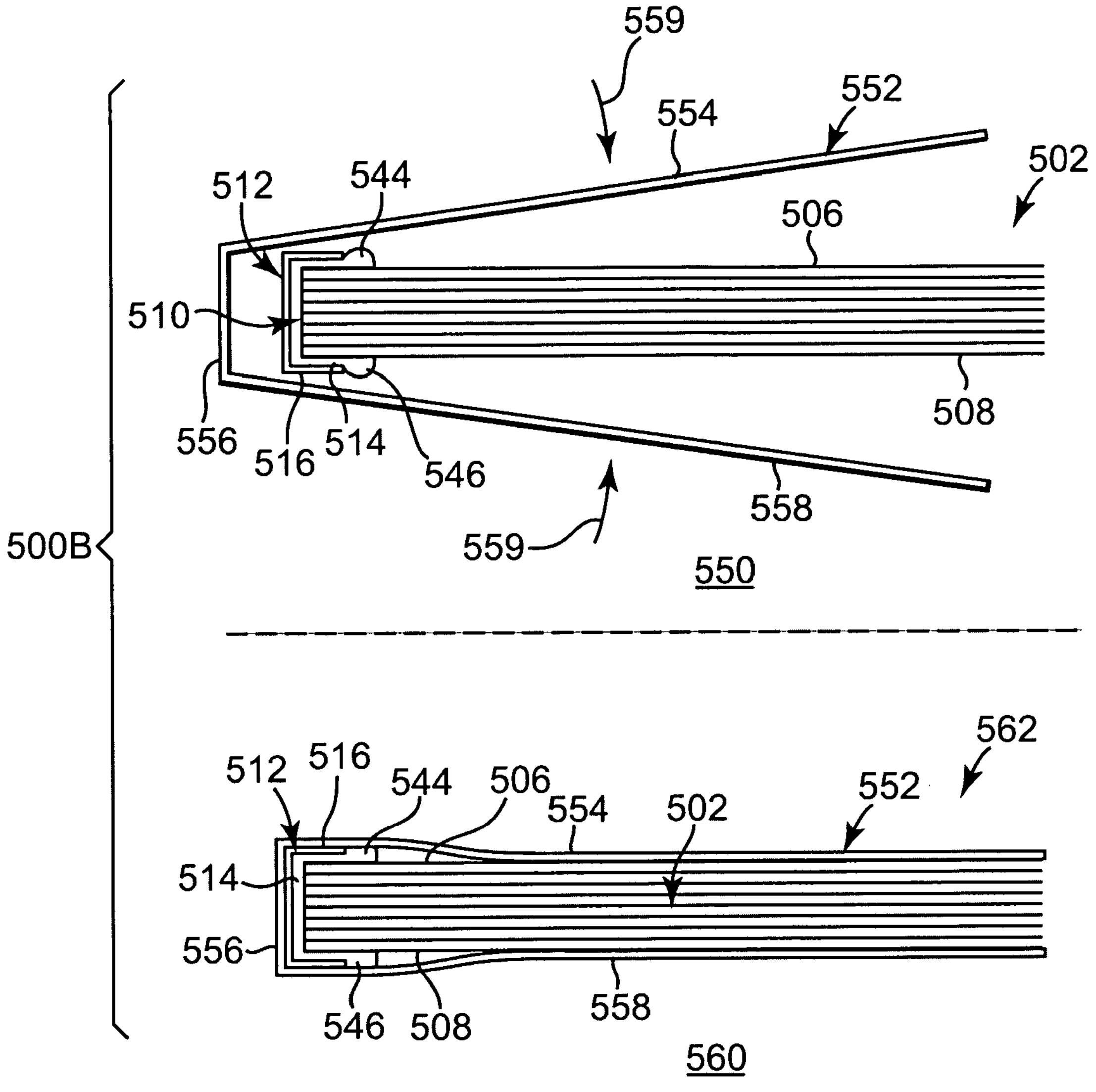
FIG. 5B illustrates the remaining portion of the system and method of system 5A.

FIGS. 5A and 5B collectively illustrate a method and system of forming an adhesive strip generally at 500A and 500B collectively. As illustrated, a text body 502 includes a plurality of sheets or pages 504 assembled in a similar manner as described above. More specifically, the text body 502 defines a first sheet or page 506 and a last sheet or page 508 each positioned on an opposite side of the text body 502. The plurality of sheets 504 are collectively positioned to form a spine 510 defined by generally aligned edges of the plurality of sheets 504. In one embodiment, the aligned sheet edges defining the spine 510 may form a substantially planar or non-planar spine 510.

The text body 502 is bound with an adhesive strip 512, which in one embodiment is similar to the adhesives described above. In one example, the adhesive strip 512 includes an adhesive layer 514 disposed on a backing or backing layer 516. The adhesive layer 514 is applied to the spine 510 of the text body 502 in a sheetwise manner, in a one-step manner after all of the plurality of sheets 504 are accumulated, or in another suitable manner. Examples of suitable adhesives to comprise the adhesive layer 514 include a hot melt adhesive, a light curable adhesive, or a moisture curable adhesive.

In one embodiment, the adhesive strip 512 includes a polyester thermal bond film, such as Thermo-Bond® film 615 produced by 3M Corporation of Minneapolis, Minn., in which the adhesive layer 514 has a thickness of approximately 0.015 inch and the backing 516 has a thickness of approximately 0.004 inch. In one example, the adhesive layer 514 flows or becomes tacky upon being heated to a flow or melt temperature. The adhesive layer 514 is formulated to remain tacky for a period of time, such as for at least 30 seconds, following removal of a heat source from the adhesive layer 514. In one embodiment, the backing 516 is a coated paper liner or other suitable backing. In one example, the backing 516 is substantially impervious to the adhesive layer 514 such that little or no adhesive is translated through the backing 516. Use of other adhesive strips and/or other methods of attaching the adhesive strip 512 are also acceptable.

The adhesive strip 512 is secured to the text body 502 to extend over the spine 510 and beyond the longitudinal edges of the spine 510. As such, the adhesive strip 512 defines a first wing 528 extending beyond a first longitudinal edge of the text body 502 (i.e., past the first sheet 506) and a second wing 530 extending beyond an opposite or second longitudinal edge of the text body 502 (i.e., past the last sheet 508).

An adhesive forming system 520 is generally illustrated in FIG. 5A. The adhesive forming system 520 includes a first member or roller 522 and a second member or roller 524 laterally spaced from the first roller 522. In one embodiment, at least a portion of the outer surface of each of the first roller 522 and the second roller 524 includes a curved portion 526 configured to interact with the adhesive strip 512 on the text body 502. In one example, the curved portion 526 of each roller 522 and 524 is formed of at least a 90-degree circular sector of the roller 522 or 524. With this in mind, in one embodiment, the curved portion 526 is sized to have an arc length similar to a distance each wing 528 and 530 extends from the spine 510. In one embodiment, each of the first roller 522 and the second roller 524 has a substantially circular cross-section.

In one embodiment, each of the first roller 522 and the second roller 524 are configured to rotate about an axis and are spring loaded to more predictably interact with the text body 502. In one example, spring loading of the rollers 522 and 524 facilitates roller adjustment to apply similar levels of compression to text bodies of various thicknesses.

In operation 540, the text body 502 is initially positioned relative to the adhesive forming system 520 such that the text body 502 is laterally centered relative to the collective positioning of the first roller 522 and the second roller 524. Upon proper positioning, the text body 502 is advanced from right to left as indicated by the horizontal arrow 532 such that first roller 522 and second roller 524 respectively contact the first wing 528 and the second wing 530 of the adhesive strip 512. In another embodiment, the adhesive forming system 520 is moved towards the text body 502 while the text body 502 remains stationary.

In one embodiment, each roller 522 and 524 contacts a respective portion of the adhesive strip 512, namely one of the first wing 528 and the second wing 530, in a substantially simultaneous and, therefore, synchronized, manner. In one embodiment, each roller 522 and 524 substantially contacts the respective first wing 528 or the second wing 530 rather than the portion of the adhesive strip 512 adjacent the spine 510. In one embodiment, the adhesive forming system 520 is specifically configured to prevent or decrease the occurrence of either roller 522 or 524 substantially contacting areas of the adhesive strip 512 positioned directly over the spine 510.

In an operation 542, the text body 502 is further advanced toward and eventually between the rollers 522 and 524. During this operation, the rollers 522 and 524 interact with the adhesive strip 512 causing the wings 528 and 530 to fold over and toward the respective first sheet 506 and last sheet 508 of the text body 502. In one example, the rollers 522 and 524 are sufficiently biased so as not to begin to rotate until contacting the respective wing 528 and 530 at a position adjacent to the spine 510. In one embodiment, each of the first roller 522 and the second roller 524 are heated and, as such, contact the adhesive strip 512 to provide sufficient heat to melt or flow the adhesive layer 514. For example, a temperature at or above 350° F. can be used to flow a polyester thermal bond film, such as the Thermo-Bond® film 615 produced by 3M Corporation. When the adhesive layer 514 flows, the adhesive layer 514 is tacky and can be used to adhere components together. With this in mind, the rollers 522 and 524 compress the flowing adhesive strip 512 while folding the adhesive strip 512 over the text body 502 to respectively secure the wings 528 and 530 to first and last text body sheets 506 and 508.

As the text body 502 continues to be advanced between the pair of rollers 522 and 524 as illustrated in an operation 548, a portion of the flowing adhesive layer 514 is forced or squeezed from between the backing 516 and the first and last sheets 506 and 508 to form exposed adhesive beads 544 and 546. More specifically, the exposed adhesive bead 544 is formed at an edge of the first wing 528, and the exposed adhesive bead 546 is formed at an edge of second wing 530. In one embodiment, each exposed adhesive bead 544 and 546 has a diameter greater than approximately 1 mm. In this manner, each exposed adhesive bead 544 and 546 extends above the surface of the respective first or last sheet 506 or 508 a distance greater than a thickness of the backing 516. In one embodiment, each of the exposed adhesive beads 544 and 546 has a diameter less than or equal to approximately 4 mm or larger.

Once the exposed adhesive beads 544 and 546 are formed with the desired properties and/or each of the rollers 522 and 524 nears an edge of the respective wing 528 or 530, the text body 502 stops advancing through the rollers 522 and 523 and is translated back in a direction indicated by arrow 549, which is substantially opposite to the advancement direction that was illustrated with respect to operations elements 540 and 542. In this manner, the text body 502 is pulled out and away from the first roller 522 and the second roller 524 until the rollers 522 and 524 no longer contact the adhesive strip 512.

In an operation 550 illustrated in FIG. 5B, a cover 552 is positioned relative to the text body 502. The cover 552 can be prepared to a selected spine width, such as a spine width corresponding to a dimension of the spine 510 of the text body 502. In one embodiment, the cover 552 is folded to define a first panel 554, a second panel 556 adjacent the first panel 554, and a third panel 558 adjacent the second panel 556 opposite the first panel 554. The second panel 556 is generally aligned with the spine 510 of the text body 502, and the first panel 554 and the third panel 558 are generally positioned to respectively cover the first sheet 506 and the last sheet 508 of the text body 502.

Once positioned, the cover 552 is moved as generally indicated by the arrow 559 in FIG. 5B until the second panel 556 contacts the portion of the adhesive strip 512 positioned directly over the spine 510 of the text body 502. The first panel 554 and the third panel 558 are each rotated towards a respective side of the text body 502 (i.e., towards the first or last sheet 506 or 508). When rotated towards the text body 502, the first panel 554 contacts the exposed adhesive bead 544, and the third panel 558 contacts the exposed adhesive bead 546. Since the adhesive layer 514 is specifically formatted to remain tacky for a period of time following removal of the heated rollers 522 and 524, the exposed adhesive beads 544 and 546 are still tacky at an operation 560. In this manner, the first panel 554 is adhered to the first sheet 506 via adhesive bead 544, and the second panel 556 is adhered to last sheet 508 via adhesive bead 546. The cover 552 adhered to the text body 502 forms a bound document 562 with a floating spine, which is particularly conducive to easy opening, closing, and other manipulation of the resulting bound document 562.

Figure 6:
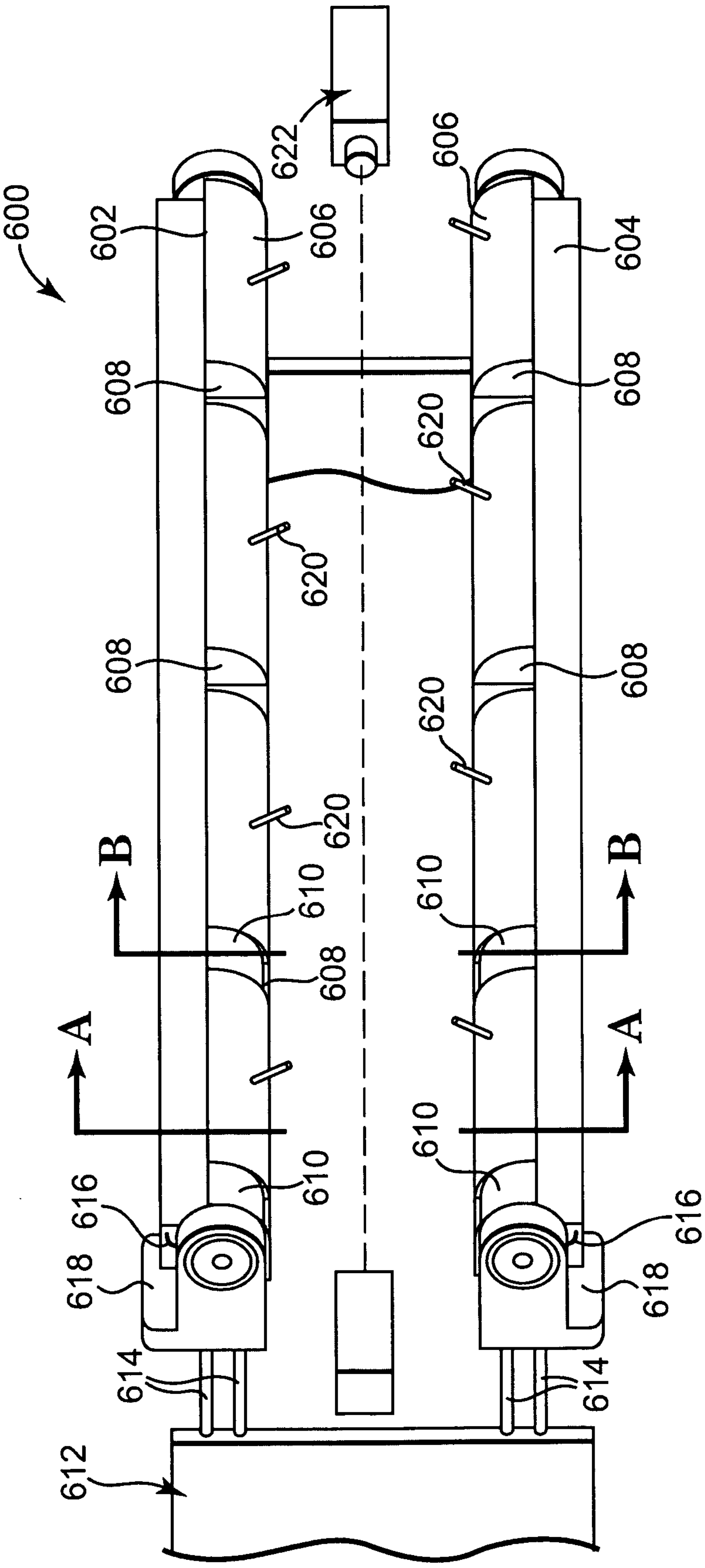
FIG. 6 illustrates one embodiment of a heat roller system configured to manipulate an adhesive strip on a text body.
Figure 6A:
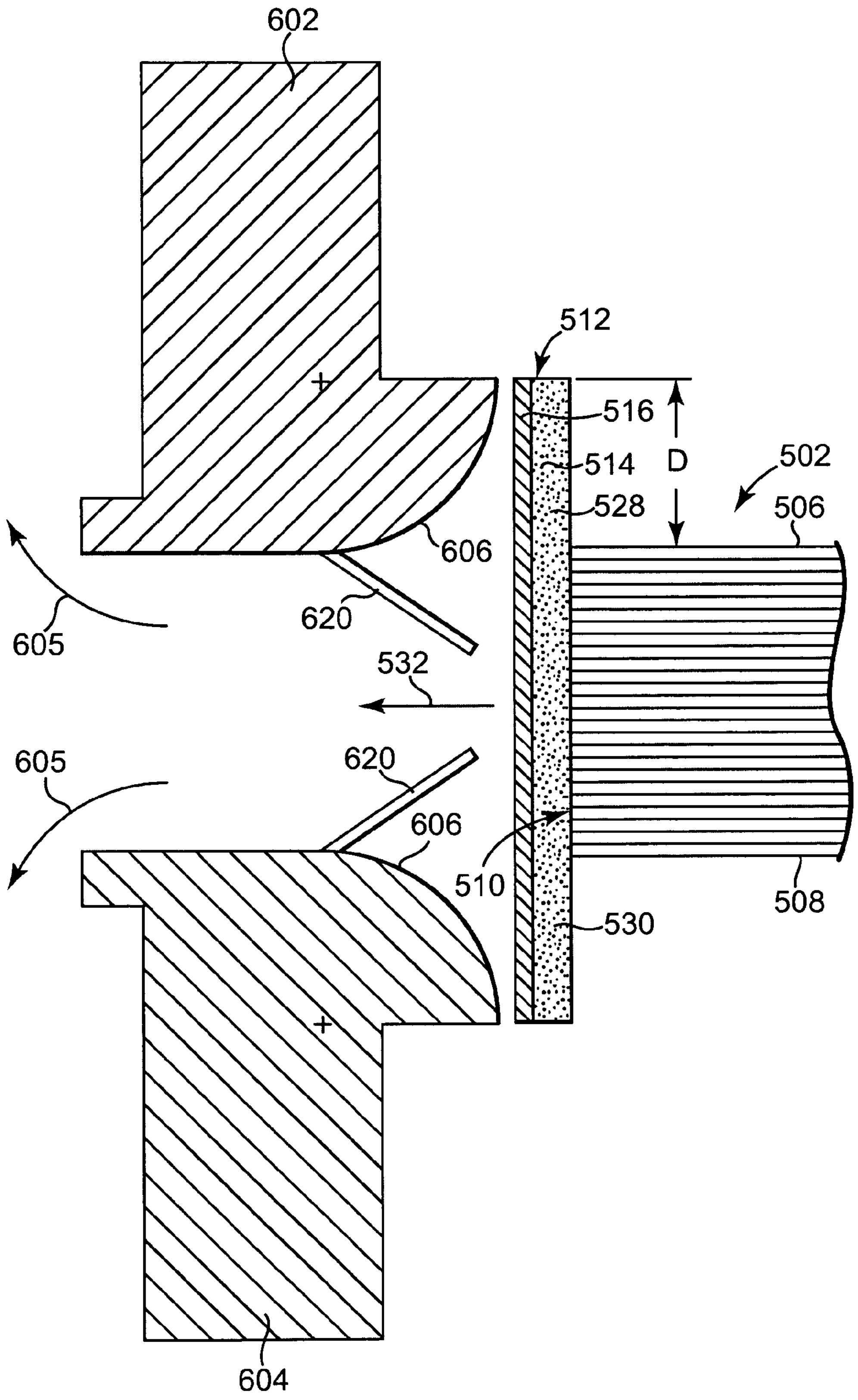
FIG. 6A is a cross-sectional view of the heat roller system of FIG. 6 taken along the line A-A with a text body.
Figure 6B:
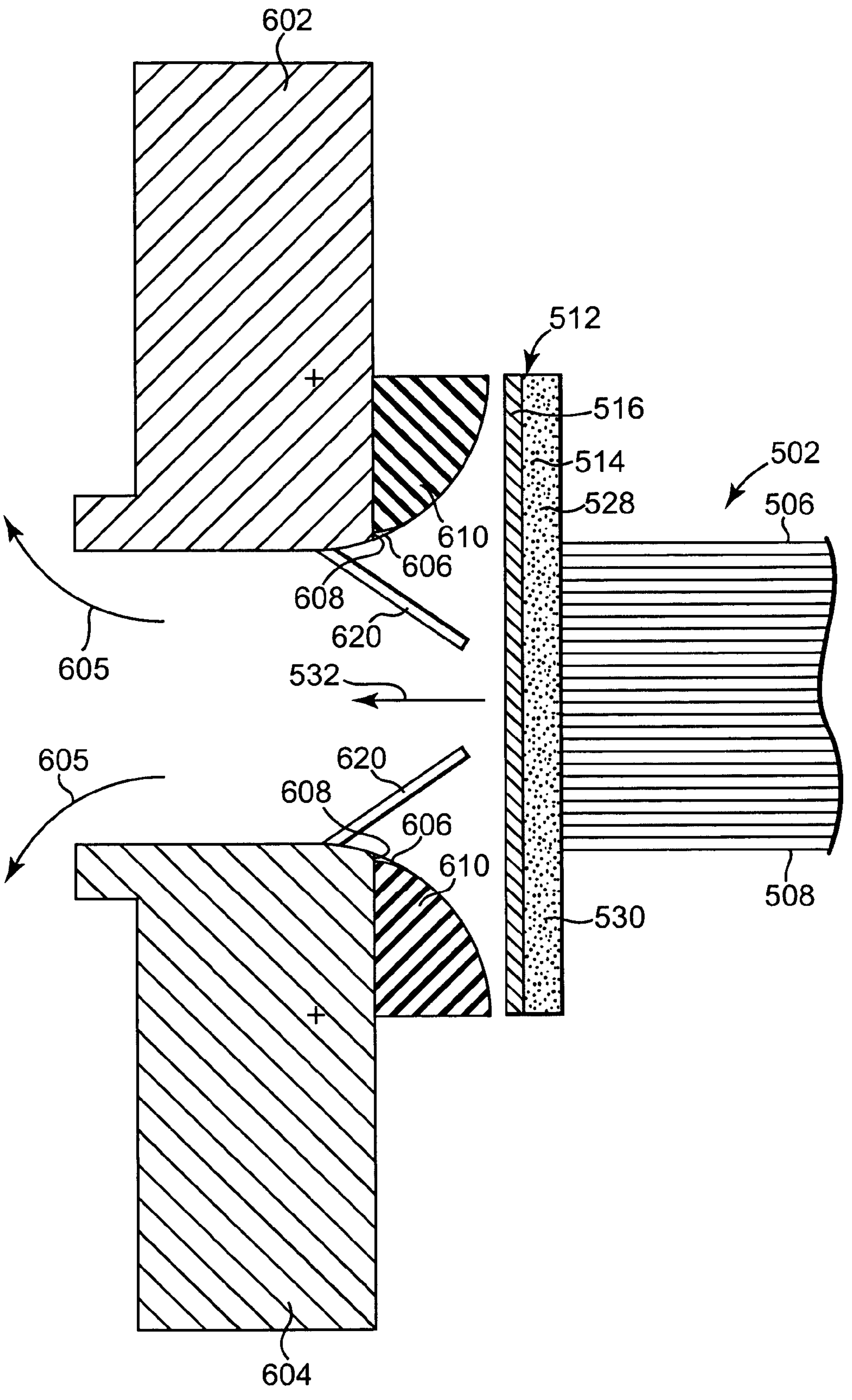
FIG. 6B is a cross-sectional view of the heat roller system of FIG. 6 taken along the line B-B with a text body.

FIGS. 6, 6A, and 6B more particularly illustrate one embodiment of an adhesive forming system 600 for use with the text body 502. The adhesive forming system 600 includes a first roller 602 and a second roller 604 laterally spaced from the first roller 602. The adhesive forming system 600 and the first and second rollers 602 and 604 generally function in a manner similar to the adhesive forming system 520 of FIGS. 5A and 5B. More specifically, during use, the text body 502 is linearly advanced, as generally indicated by arrow 532, such that the adhesive strip 512 of the text body 502 contacts rollers 602 and 604, thereby, inducing rotation of rollers 602 and 604, as generally indicated by arrows 605.

In one embodiment, the first roller 602 and the second roller 604 are similarly constructed. As such, although only the first roller 602 is explicitly described below for clarity, it should be understood that the second roller 604 is similarly formed. In one embodiment, the first roller 602 is generally formed with a curved contact surface or portion 606. The curved contact surface 606 is formed from a circular sector of the first roller 602 and defines an arc length. The curved contact surface 606 is configured to interact with the text body 502, and more particularly, the adhesive strip 512. As used throughout this application, the term "roller" refers to rotating members having one of a circular cross-section, a substantially rectangular cross-section with one or more curved surfaces, or other suitable cross-section defining a curved surface for engaging the adhesive strip 512.

The specific arc length defined by the contact surface 606 is dependent upon a variety of factors including a distant D in which the first wing 528 extends from the first sheet 506 (illustrated in FIG. 6A) and the size and/or radius of the first roller 602. As such, the contact surface 606 has a sufficient arc length to interact with a substantial portion of the first wing 528 to press the first wing 528 against the first sheet 506. In one embodiment, the contact surface 606 is configured to roll along a substantial length of the first wing 528 except for a distance, such as approximately 1 mm, from the edge of the first wing 528 opposite the spine 510. In this manner, the contact surface 606 is generally configured so as not to contact the exposed adhesive bead 544 (illustrated in FIGS. 5A and 5B).

The first roller 602 is generally formed of any suitable thermally conductive material, such as aluminum, and is configured to be heated to a particular temperature sufficient to at least partially melt, flow, or otherwise de-solidify the adhesive layer 514. In one embodiment, the first roller 602 includes a plurality of notches 608 longitudinally spaced along and extending inwardly from the contact surface 606. In one example, at least a portion of the notches 608 are positioned along the first roller 602 to correspond with at least one available size of paper used to form the text body 502.

Figure 7:
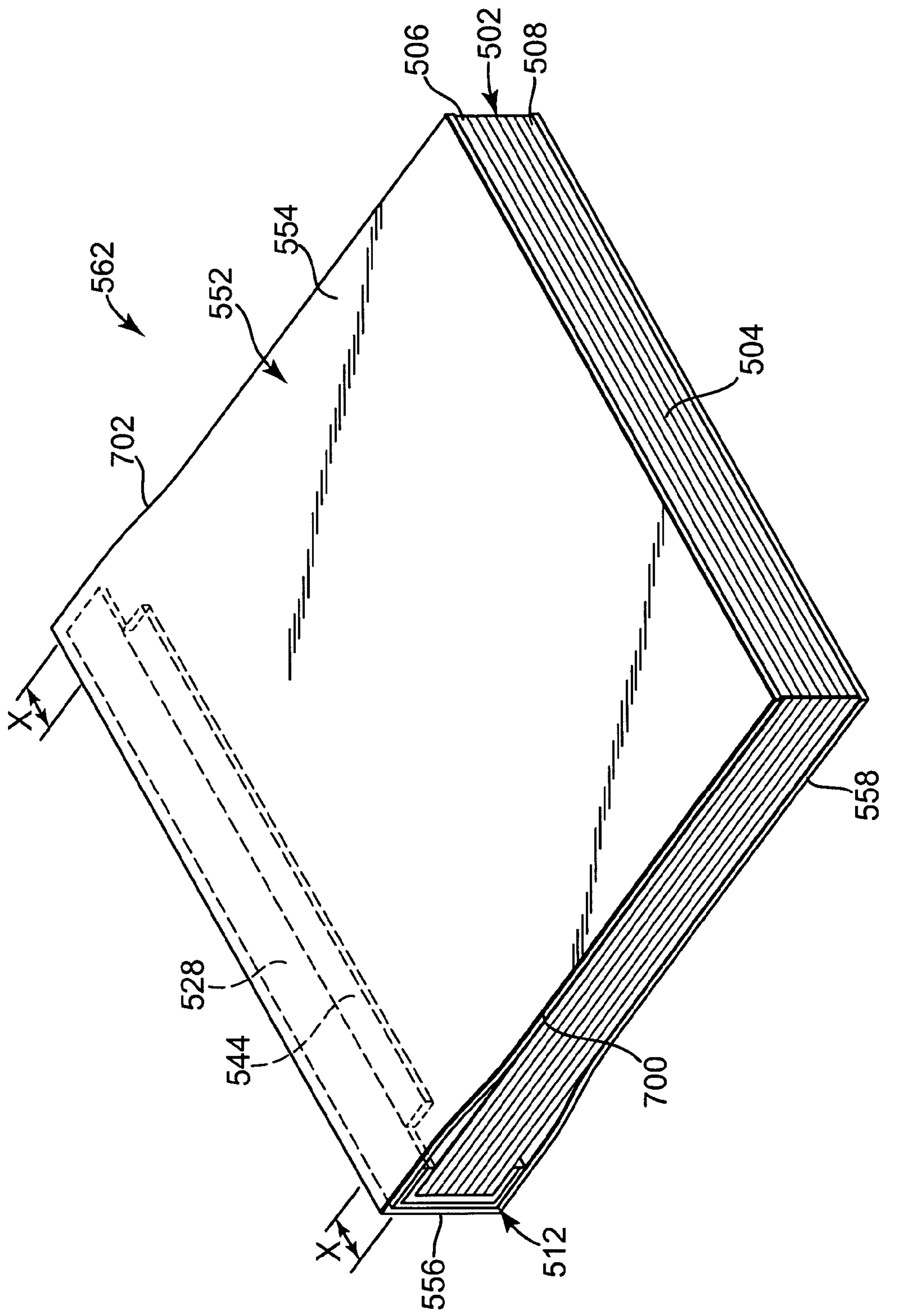
FIG. 7 illustrates on embodiment of a bound document.

More specifically, as illustrated with additional reference to FIG. 7, when the adhesive strip 512 is compressed by the rollers 602 and 604 to form an exposed adhesive bead 544 (illustrated in FIG. 5A), it is generally undesirable for adhesive to squeeze along an outside lateral edge 700 or 702 of the text body 502. In particular, any adhesive that would otherwise be placed along the outside lateral edge 700 or 702 of the text body 502 is visible to end users of the bound document 562, which decreases the aesthetic appeal and professional look of the bound document 562.

As such, it is generally desirable to decrease or prevent compression of the adhesive strip 512 within a distance X, such as 5 mm, from the lateral outside edges 700 and 702 of the text body 502. Therefore, in one embodiment, each notch 608 is formed to correspond to an available sheet or page size for forming the text body 502 to decrease the compression of the text body 502 near the respective lateral edges 700 and 702 of the selected sheets 504. In one embodiment, each notch 608 is equal to or greater than approximately 5 mm in length and is configured to remove or at least decrease compression of the adhesive strip 512 and, therefore, the exposed adhesive bead 544 near the lateral text body edges 700 and 702.

In one embodiment, at least a portion of the notches 608 are at least partially filled with or support a friction enhancing material or member 610 configured to enhance friction between the first roller 602 and the adhesive strip 512 of text body 502. In particular, in order to decrease slippage of the adhesive strip 512 relative to the first roller 602, the friction enhancing materials 610 are positioned along the length of the first roller 602 to contact the adhesive strip 512 in a manner increasing friction between the first roller 602 and the adhesive strip 512. In one embodiment, the friction enhancing material 610 is substantially heat resistant, such as a silicone based rubber.

In one example, the friction enhancing materials 610 are positioned within a portion of the notches 608 in a manner increasing friction while continuing to decrease compression of the adhesive strip 512 at areas corresponding with the notches 608. In particular, the friction enhancing materials 610 are formed with relatively greater conformability than the remainder of the first roller 602. In one embodiment, the friction enhancing materials 610 are formed of a polymer, rubber, or other suitable material. As such, upon interaction of a friction enhancing material 610 with the adhesive strip 512, friction is enhanced while the friction enhancing material 610 sufficiently conforms or deflects to locally prevent or decrease compression of the adhesive strip 512, which decrease the amount of adhesive that may squeeze onto the lateral edges 700 and 702 of the text body 502.

In one embodiment, the second roller 604 is substantially similar to the first roller 602 such that, upon placement of the rollers 602 and 604 within an adhesive forming system 600, the notches 608 and each of the rollers 602 and 604 are symmetrically positioned relative to one another. In one embodiment, each of the rollers 602 and 604 is rotatably connected to the overall chassis 612 of an adhesive forming system 600.

Moreover, in one embodiment, each of the rollers 602 and 604 is spring-loaded or otherwise resiliently biased towards each other to more consistently contact and compress the adhesive strips 512 coupled to various text bodies 502. The resiliently biased rollers 602 and 604 facilitate forming the adhesive strip 512 on a variety of text bodies 502 having various thicknesses. For example, in one embodiment, at least one spring 614 is coupled to each end of the rollers 602 and 604 or a roller support to provide lateral compliance, which accounts for variance in the thickness of the text body 502 and provides a more consistent compressive force to the adhesive strip 512.

In one embodiment, a rotational spring 616 is coupled to each end of the rollers 602 and 604 to bias or otherwise return each roller 602 and 604 to a starting position following interaction with the adhesive strip 512. A magnet 618 is optionally included near at least one end of each roller 602 and 604. The magnet 618 selectively interacts with each roller 602 and 604 to create an initial force holding the roller 602 or 604 in the starting position. As such, a larger force is needed to begin rotation of rollers 602 and 604, which generally prevents or decreases over rotation of roller 602 and 604 upon contacting the wings 528 and 530 of the adhesive strip 512 before the wings 528 and 530 contact the text body 502.

In one embodiment, one or both of the rollers 602 and 604 additionally includes actuation pins 620 extending from or relatively near the contact surface 606 of each roller 602 and 604. In particular, the actuation pins 620 are positioned to interface with the adhesive strips 512 upon translation of the text body 502 between the rollers 602 and 604. More particularly, as illustrated with respect to FIGS. 6A and 6B, movement of the text body 502 between the roller 602 and 604 causes eventual contact between the adhesive strip 512 and the actuation pins 620 initiating rotation of the rollers 602 and 604. In this respect, the actuation pins 620 are configured to facilitate substantially synchronized movement of the rollers 602 and 604. In one embodiment, the actuation pins 620 on the first roller 602 are staggered relative to the actuation pins 620 of the second roller 604. In this manner, contact between the actuation pins 620 on the first roller and the actuation pins 620 on the second roller 604 is generally prevented or decreased. In one example, no actuation pins 620 are included on one or both of the rollers 602 and 604.

In one embodiment, the adhesive forming system 600 additionally or alternatively employs a text body sensor system 622 configured to sense movement of the text body 502 toward and/or between the rollers 602 and 604. The sensor system 622 activates or actuates the rollers 602 and 604 upon sensing the text body 502. In one particular embodiment, a sensor system 622 is a light sensor configured to send a light beam along a longitudinal axis positioned between the rollers 602 and 604. Upon movement of the text body 502, the light beam transmitted by the light sensor 622 is eventually interrupted and the adhesive forming system 600 is informed that the text body 502 is in place for adhesive manipulation. Accordingly, the rollers 602 and 604 are activated (i.e., are heated and/or begin to rotate).

In one example, the position of the light sensor 622 may vary depending upon a desired lead time between sensing the text body 502 and activation of the rollers 602 and 604. For example, in some embodiments, it is desired that the rollers 602 and 604 are activated prior to actually contacting the text body 502. In one example, the sensor system 622 is positioned in front of the rollers 602 and 604 to begin activation of the rollers 602 and 604 prior to arrival of the text body 502 between the rollers 602 and 604.

In particular, if the contact surfaces 606 of the rollers 602 and 604 are initially configured to receive one of the wings 528 or 530 that extends approximately 5 mm from the spine 510, and the actual text body 502 being presented to the rollers 602 and 604 has a wing 528 or 530 extending only 3 mm from the spine 510, it may be desired for the rollers 602 and 604 to begin rotating prior to arrival of the text body 502 to pre-register or preset the rollers 602 and 604 for interaction with a smaller than expected wing size and thus to avoid contact between the rollers 602 and 604 and the adhesive strip 514. In one example, the light sensor 622 is configured to determine whether the adhesive strip 514 is centered on the text body 502. For example, instead of forming each of the wings 528 and 530 with a 5 mm width, one of wings 528 and 530 may be 3 mm while the other is 7 mm. As such, it may be desired to pre-registers one or both of the rollers 602 and 604 to compensate for the position of the adhesive strip 512. With this in mind, light sensor 622 or other sensor configured to only measure the width of one of wings 528 or 530 may be utilized.

Figure 8:
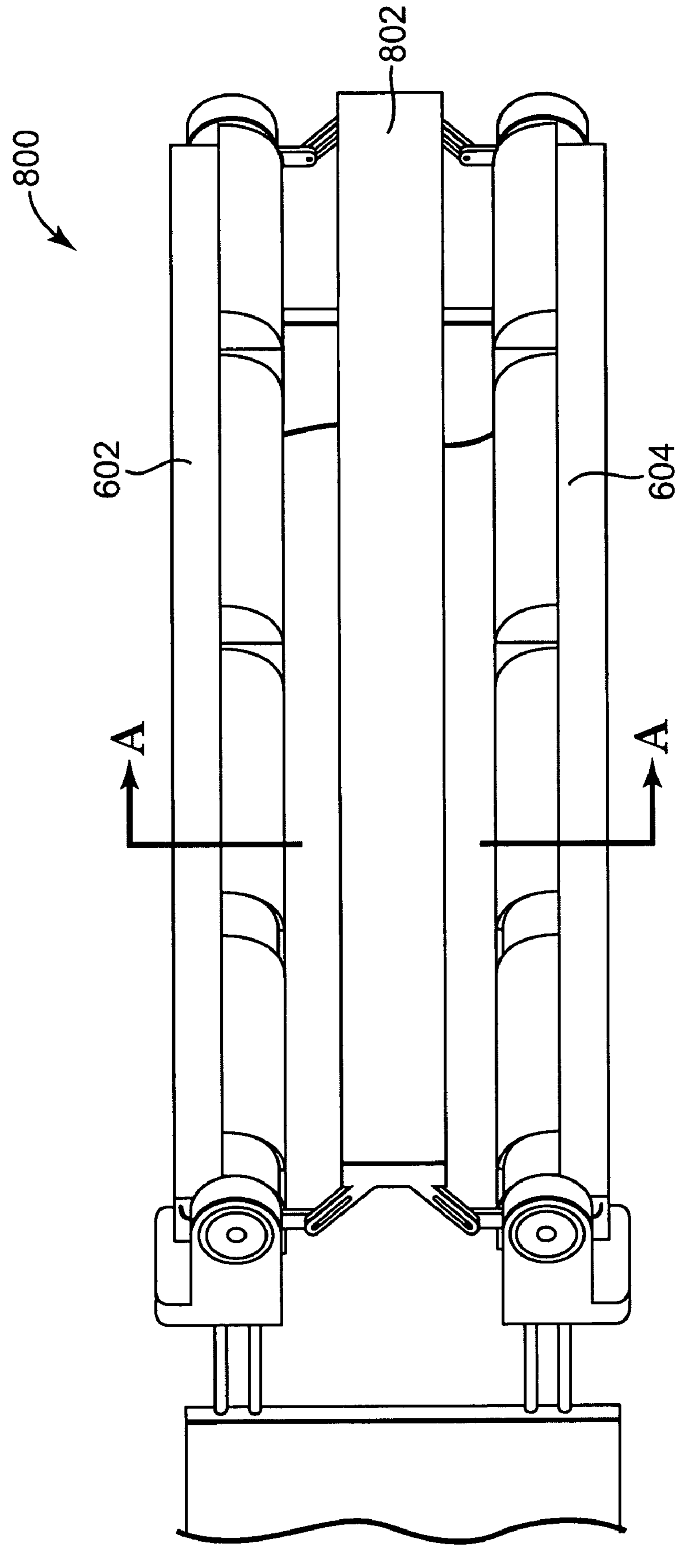
FIG. 8 illustrates one embodiment of an adhesive forming system.

FIG. 8 illustrates another embodiment of an adhesive forming system generally at 800. The adhesive forming system 800 is generally similar to the adhesive forming system 600 other than those characteristics specifically enumerated herein. In one example, as an alternative or in addition to a guide or the actuator pins 620, the adhesive forming system 800 includes a spine protection plate or bar 802 positioned to longitudinally extend between the rollers 602 and 604 and having a width extending laterally between the rollers 602 and 604. In one embodiment, the spine protection plate 802 is coupled with each roller 602 or 604 or an actuator thereof such that lateral movement of the spine protection plate 802 induces rotation of the rollers 602 and 604. In one embodiment, the connection between the spine protection plate 802 and each roller 602 and 604 is a cam connection.

Figure 8A:
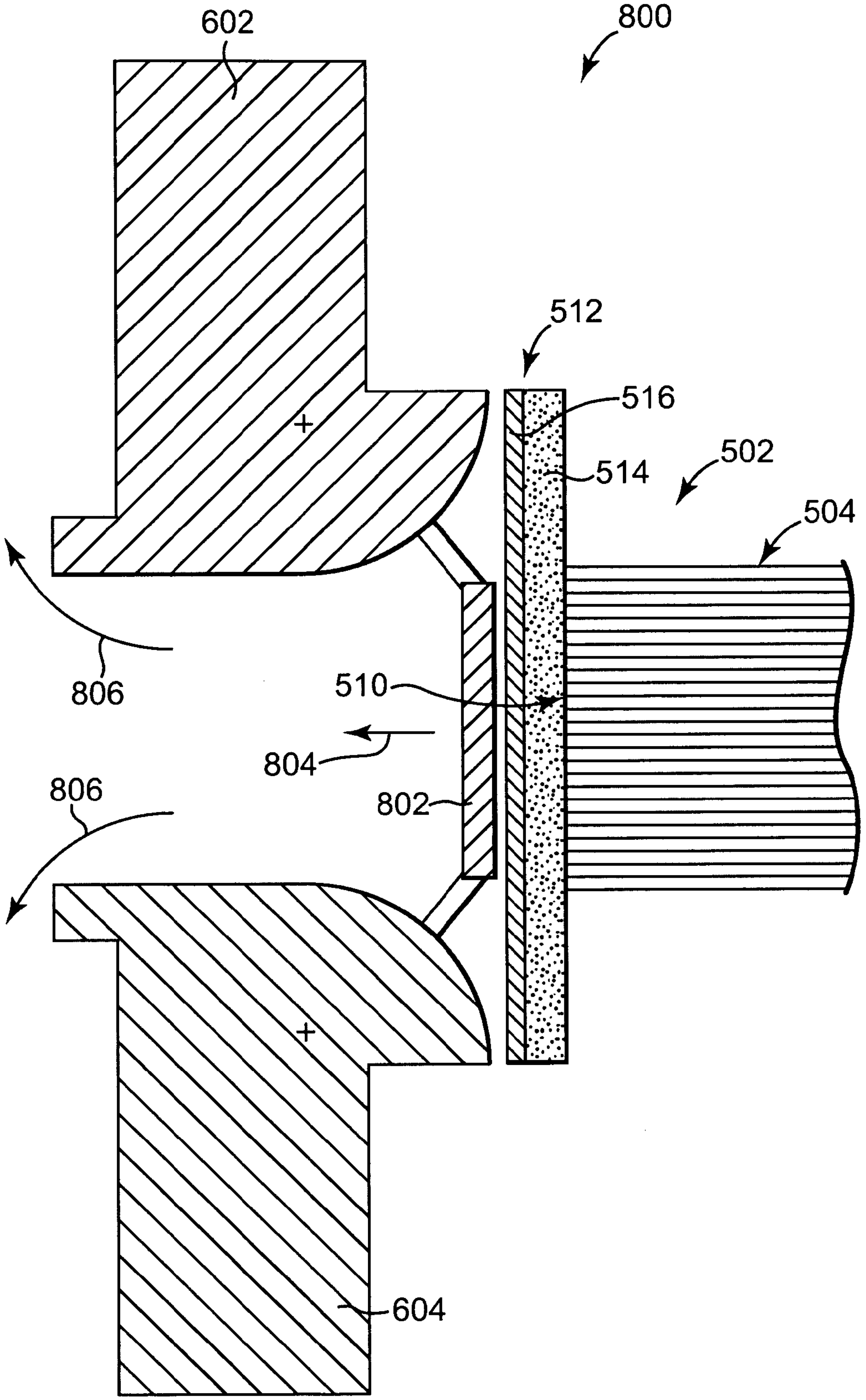
FIG. 8A is a cross-sectional view of the adhesive forming system of FIG. 8 taken along the line A-A with a text body.

As such, in view of FIG. 8A, movement of the text body 502 towards the spine protection plate 802, as generally indicated by the arrow 804, causes a portion of the adhesive strip 512 corresponding with the spine 510 of text body 502 to contact the spine protection plate 802. In this respect, as adhesive strip 512 contacts the spine protection plate 802 while the text body 502 is advanced through the adhesive forming system 800. The resulting linear movement of the spine protection plate 802 induces rotation to the rollers 602 and 604, as generally indicated by the arrows 806. In this respect, the spine protection plate 802 facilitates synchronous rotation of the rollers 602 and 604.

Moreover, in one embodiment, the spine protection plate 802 is formed of a substantially non-thermal conductor, such as plastic, PVC, etc., and therefore, the spine protection plate 802 is at least partially configured to thermally isolate the portions of the adhesive layer 514 in direct contact with the spine 510 of the text body 502 from the heat of the rollers 602 and 604. In one embodiment, the spine protection plate 802 is formed of a material with low thermal conduction, such as the Victrex® PEEK™ polymer. As such, the portion of adhesive layer 514 a contact with the spine 510 is generally protected against melting or reflow, which could cause the adhesive layer 514 to release or detachment of one or more of the sheets 504 forming the spine 510. Therefore, application of the spine protection plate 802 to areas of the adhesive strip 512 corresponding with the spine 510 of the text body 502, thereby, generally protects against loosening or detachment of any other plurality of sheets 504 from the adhesive strip 512.

Figure 9:
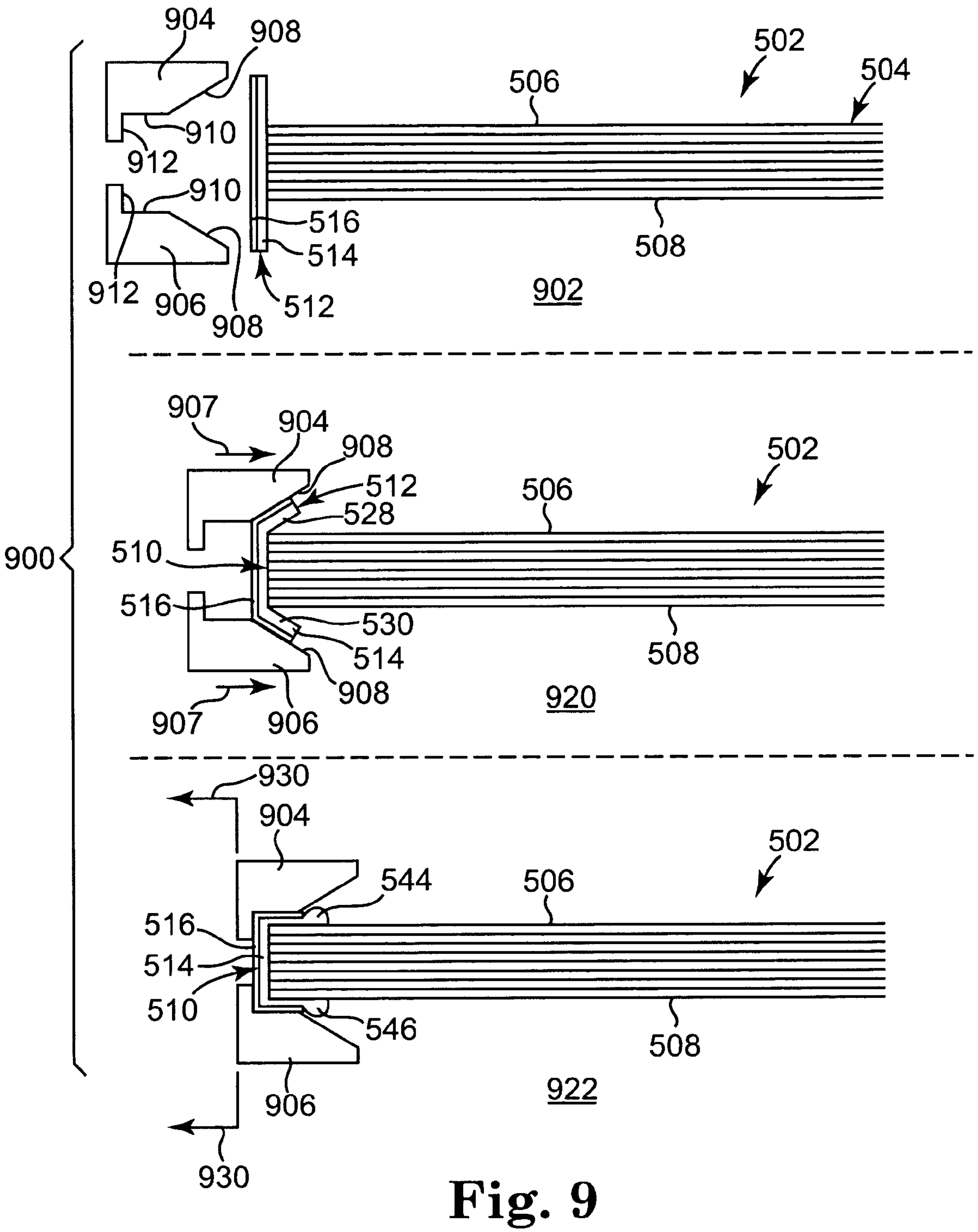
FIG. 9 illustrates one embodiment of a method and system of forming an adhesive strip.

At 900, FIG. 9 generally illustrates another embodiment of a method and system of forming the adhesive strip 512. The method and system 900 is similar to the method and system 500A of FIG. 5A. However, as illustrated at operation 902, a pair of heated clamps or members 904 and 906 are used as an alternative to the heated rollers 522 and 524 (illustrated in FIG. 5A). Each clamp 904 and 906 is heated and spring-loaded or otherwise resiliently biased in a similar manner as rollers 522 and 524. Clamps 904 and 906 generally define linear contact surfaces and are configured to move in a linear, non-rotating manner as generally indicated by arrows 907 to contact the adhesive strip 512 of the text body 502. More specifically, the contact surfaces of the clamps 904 and 906 include an angled contact surface 908, a transverse contact surface 910, and a lateral contact surface 912. The transverse contact surface 910 extends from an end of the angled contact surface 908, and the lateral contact surface 912 extends from the transverse contact surface 910 opposite the angled contact surface. In one embodiment, one or more of the contact surfaces 908, 910, and 912 are coated with a friction reducing material, such as a thin silicon tape (generally less than 0.002 inches thick), to decrease stress and/or tearing of the adhesive strip 512 during use.

In operation 902, the text body 502 is laterally centered relative to the collective position of the clamps 904 and 906. Upon proper positioning, at operation 920, the clamps 904 and 906 are translated toward the text body 502 causing the angled contact surface 908 of each clamp to contact a respective wing 528 and 530 of the text body 502. In other embodiments, the text body 502 is moved while the clamps 904 and 906 are maintained in a relatively stationary position. The heat and compression applied to wings 528 and 530 by the angle contact surfaces 908 begins to fold wings 528 and 530 toward the respective first and last sheets 506 and 508 of the text body 502.

At operation 922, the clamps 904 and 906 are further advanced towards the text body 502, or vice versa, causing the transverse contact surfaces 910 to contact and completely fold down each wing 528 and 530. As each wing is completely folded down, at least a portion of the flowing adhesive from the adhesive layer 514 is forced or squeezed out from between the backing 516 and the respective first or last sheet 506 or 508 to form one of exposed adhesive beads 544 and 546. In one embodiment, the lateral contact surfaces 912 contact a portion of the adhesive strip 512 to press the adhesive strip 512 against the spine 510 of the text body 502. In one example, the compression from the lateral contact surface 912 may re-secure any portion of the spine 510 that may have been fully or partially released from the adhesive strip 512 due to the heat of clamps 904 and 906.

Once the exposed adhesive beads 544 and 546 are formed, the clamps 904 and 906 are removed from the adhesive strip 512. In one example, before applying the cover, the clamps 904 and 906 are moved further apart from one another and then back away from the text body 502 as generally indicated by arrows 930 to prevent or decrease tearing of the adhesive strip 512 and/or removal of the adhesive strip 512 from the text body 502. Subsequently, a cover can be applied to the text body 502 in a similar manner as described with respect to FIG. 5B.

Figure 10:
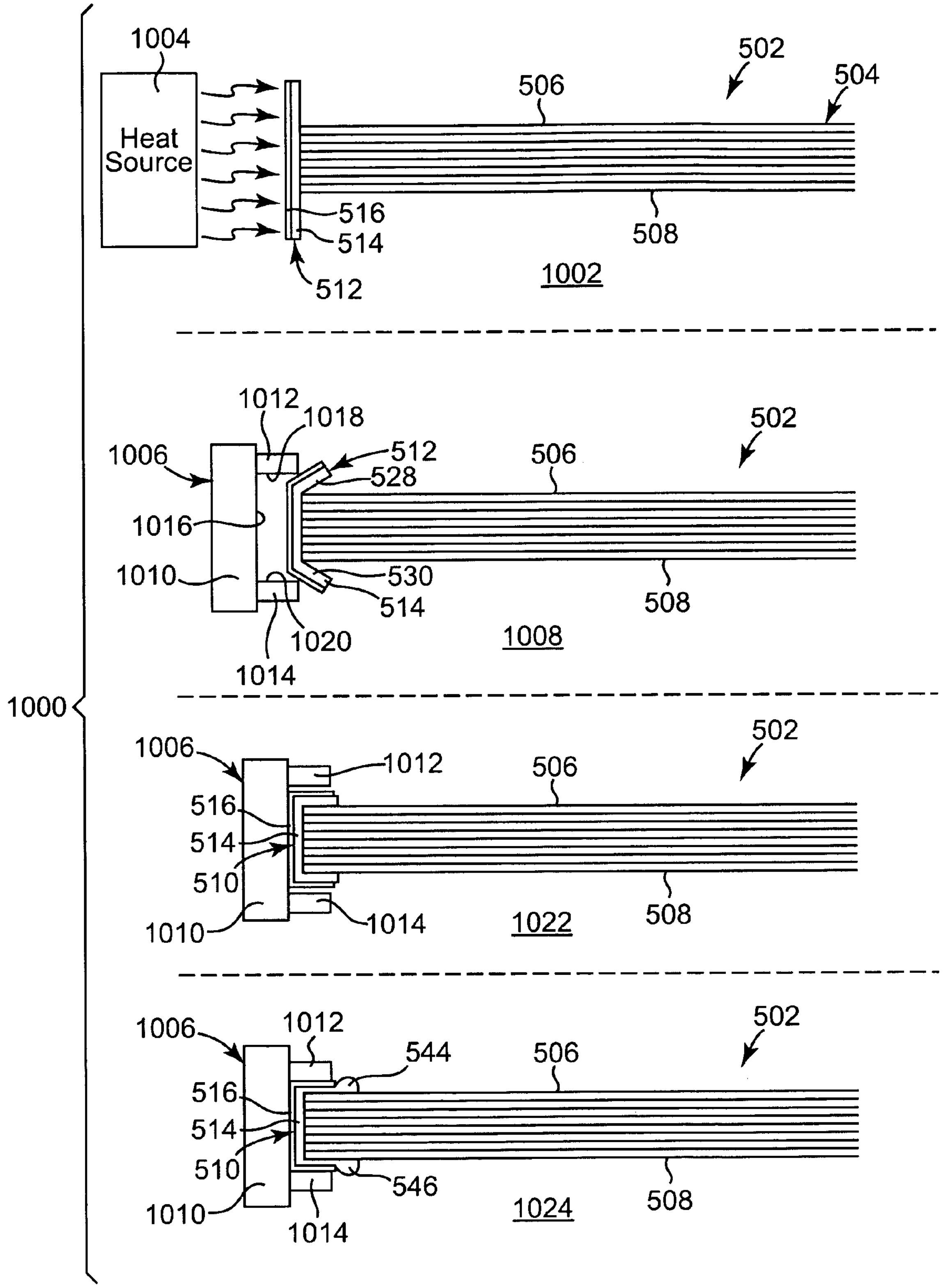
FIG. 10 illustrates one embodiment of a method and system of forming an adhesive strip.

At 1000, FIG. 10 generally illustrates another embodiment of a method and system of forming the adhesive strip 512. The method and system 1000 is similar to the method and system 900 of FIG. 9 except for those differences enumerated herein. At 1002, the adhesive strip 512 on text body 502 is heated by a heat source 1004 to increase pliability of the adhesive strip 512. After heating at 1002, but prior to cooling of the adhesive strip 512, an adhesive forming system 1006 is aligned with and advanced toward to the adhesive strip 512 at 1008. The adhesive forming system 1006 generally includes a main linear portion 1010, a first member or clamp 1012, and a second member or clamp 1014. Clamps 1012 and 1014 are spaced from one another and movably coupled with main linear portion 1010. Each clamp 1012 and 1014 generally extends perpendicularly from main linear portion 1010. As such, the adhesive forming system 1006 is formed in a general C-shape.

The main linear portion 1010, the first clamp 1010, and the second clamp 1012 each form an inner adhesive contact surface 1016, 1018, and 1020, respectively. In one embodiment, one or more contact surface 1016, 1018, and 1020 is coated with a friction reducing material. At 1008, the adhesive forming system 1006 is laterally centered relative the text body 502 and advanced toward the text body 502 and, therefore, towards the adhesive strip 512. At 1022, the adhesive forming system 1006 is positioned around the adhesive strip 512.

At 1024, the clamps 1012 and 1014 are heated and moved toward one another to press the wings 528 and 530 against the text body 502, which forces a portion of the adhesive layer 514 out from between each of the wings 528 and 530 and the text body 502 to form the exposed adhesive beads 544 and 546. In one embodiment, the main linear portion 1010 is formed of a non- or low thermally conductive material to prevent or decrease reheating of the adhesive layer 514 at the spine 510 of the text body 502.

Following formation of the adhesive beads 544 and 546, the adhesive forming system 1006 is removed from around the adhesive layer 512 and a cover 552 is applied to the text body 502 in a similar manner as described with respect to FIG. 5B. In one embodiment, prior to removing adhesive forming system 1006 from around adhesive layer 512, the clamps 1012 and 1014 are moved away from each other to decrease tearing of the adhesive strip 512 and/or removal of the adhesive strip 512 from the text body 502.

Although specific embodiments have been illustrated and described herein for purposes of description of the preferred embodiment, will be appreciated by those of ordinary skill in the art that a wide variety of alternate and/or equivalent implementations calculate to achieve the same purposes may be substituted for the specific embodiments shown and described without departing from the scope of the present invention. Those with skill in the chemical, mechanical, electromechanical, electrical, and computer arts will readily appreciate the present invention able implemented in a vary wide variety of embodiments. This application is intended to cover any adaptations or variations of preferred embodiments discussed herein. Therefore, it is manifestly intended that this innovation be limited only by the claims and the equivalents thereof.

What is claimed is:

1. A method of forming a bound document, the method comprising:

providing a text body defining a first sheet and a last sheet, aligned edges of the sheets defining a spine, the spine being bound with an adhesive strip to define a first wing and a second wing of the adhesive strip, wherein the first wing extends beyond the first sheet of the text body, and the second wing extends beyond the last sheet of the text body;

compressing the first wing of the adhesive strip against the first sheet to form a first exposed adhesive bead;

compressing the second wing of the adhesive strip against the last sheet to form a second exposed adhesive bead; and applying a cover over the text body and against the first and second exposed adhesive beads to attach the cover to the bound text body as a floating cover.

2. The method of claim 1, wherein the first exposed adhesive bead is formed near a first wing edge, and the second exposed adhesive bead is formed near a second wing edge.

3. The method of claim 1, wherein providing the text body bound with the adhesive strip includes:

providing a heat-melt adhesive layer in contact with the spine of the text body, and providing a backing layer adjacent the adhesive layer and opposite the spine, wherein the backing layer is substantially non-adhesive and substantially impervious to the heat-melt adhesive layer.

4. The method of claim 1, wherein compressing the first wing occurs substantially simultaneously with compressing the second wing.

5. The method of claim 1, wherein the compressing the first wing includes heating the first wing, and compressing the second wing includes heating the second wing.

6. The method of claim 5, wherein compressing the first wing includes protecting the spine in a manner substantially inhibiting the adhesive strip from releasing any of the sheets of the text body.

7. The method of claim 5, wherein compressing the first wing includes providing an area of decreased compression near a first end and a second end of the spine of the text body.

8. The method of claim 5, wherein compressing the first wing and the second wing of the adhesive strip includes:

advancing the text body between a pair of heated members such that the heated members contact the adhesive strip to fold over the first wing of the adhesive strip to interact with the first sheet and to fold over the second wing of the adhesive strip to interact with the last sheet.

9. The method of claim 8, wherein the pair of heated members is a pair of heated rollers, and advancing the text body between the pair of heated members includes interfacing the text body with an actuation device configured to induce rotation of the heated rollers.

10. The method of claim 8, wherein advancing the text body through the pair of heated members includes sensing the position of the text body relative to the pair of heated members before the text body interacts with the pair of heated members.

11. The method of claim 10, wherein advancing the text body through the pair of heated members includes triggering activation of the heated members based upon sensing the position of the text body relative to the pair of heated members.

12. The method of claim 8, further comprising:

sensing a width of at least one of the first wing an the second wing; and registering the position of at least one of the pair of heated members based on the sensed width prior to establishing contact between the pair of heated members and the adhesive strip.

13. The method of claim 1, wherein providing a text body bound with the adhesive strip includes individually binding each of the plurality of sheets in the text body to the adhesive strip in a sheetwise manner.

14. A method of forming a bound document, the method comprising: binding a spine of a text body with a adhesive strip, the adhesive strip including a backing layer and an adhesive layer and positioned over the spine to define a first wing extending from the spine and over a first page of the text body and a second wing extending from the spine and over a last page of the text body;

folding the first wing of the adhesive strip against the first page to force a first portion of the adhesive layer to extend beyond the backing layer and onto the first page;

folding the second wing of the adhesive strip against the last page to force a second portion of the adhesive layer to extend beyond the backing layer and onto the second page; and applying a cover over the text body and against the first and second portions of the adhesive layer to attach the cover to the text body.

15. The method of claim 14, wherein folding the first wing occurs substantially simultaneously with folding the second wing.

16. The method of claim 14, wherein folding the first wing and the second wing of the adhesive strip includes:

advancing the text body through a pair of heated members.

17. The method of claim 16, wherein advancing the bound text body through the pair of heated members includes substantially preventing the adhesive layer from extending beyond the backing layer and onto an end of the spine.

18. The method of claim 16, wherein advancing the text body through the pair of heated members includes sensing the position of the text body relative to the pair of heated members before the text body interacts with the pair of heated members.

19. The method of claim 18, wherein advancing the text body through the pair of heated members includes triggering activation of the heated members based upon sensing the position of the text body relative to the pair of heated members.

* * * * *

UNITED STATES PATENT AND TRADEMARK OFFICE

CERTIFICATE OF CORRECTION

PATENT NO. : 7,481,611 B2

APPLICATION NO. : 11/284706

DATED : January 27, 2009

INVENTOR(S) : Eric Hoarau

It is certified that error appears in the above-identified patent and that said Letters Patent is hereby corrected as shown below:

In column 15, line 2, in Claim 12, delete “an” and insert -- and --, therefor.

Signed and Sealed this

Sixth Day of April, 2010

David J. Kappos

*Director of the United States Patent and Trademark Office*